(12) United States Patent
Grundmeyer et al.

(10) Patent No.: US 11,677,436 B1
(45) Date of Patent: Jun. 13, 2023

(54) ANTENNA OPTIMIZATION FOR SATCOM WAVEFORMS

(71) Applicant: Rockwell Collins, Inc., Cedar Rapids, IA (US)

(72) Inventors: Jeffrey Grundmeyer, Walker, IA (US); John V. Thommana, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/539,708

(22) Filed: Dec. 1, 2021

(51) Int. Cl.
    *H04B 1/71*       (2011.01)
    *H04B 1/7113*    (2011.01)
    *H04B 1/7073*    (2011.01)

(52) U.S. Cl.
CPC ......... *H04B 1/7113* (2013.01); *H04B 1/7073* (2013.01); *H04B 1/71* (2013.01)

(58) Field of Classification Search
CPC ....... H04B 1/7113; H04B 1/7073; H04B 1/71
See application file for complete search history.

(56) References Cited

U.S. PATENT DOCUMENTS

| | | | |
|---|---|---|---|
| 5,533,011 A | 7/1996 | Dean et al. | |
| 7,277,679 B1 * | 10/2007 | Barratt | H04B 17/309 455/135 |
| 8,340,574 B2 | 12/2012 | Avellan et al. | |
| 9,100,361 B1 * | 8/2015 | Lucchesi | H04L 63/00 |
| 9,130,644 B2 | 9/2015 | Jayasinha | |
| 9,775,191 B2 | 9/2017 | Jayasimha et al. | |
| 11,050,443 B1 * | 6/2021 | Thommana | H04B 1/0057 |
| 2009/0161772 A1 * | 6/2009 | Sawahashi | H04L 27/261 370/345 |
| 2009/0224094 A1 * | 9/2009 | Lachenmeier | B64C 39/024 244/31 |
| 2010/0330940 A1 * | 12/2010 | Sheynblat | H04B 7/0608 455/277.1 |
| 2012/0294384 A1 * | 11/2012 | Wilcoxson | H04W 76/10 375/285 |
| 2021/0168001 A1 | 6/2021 | Agee | |

OTHER PUBLICATIONS

Anjum, M. R. et al., "Design and analyze the airborne satellite communication using phased array antenna for reliable communications" Conference Paper Jan. 2013, ICWMMN2013 Proceedings, 5 pages.

* cited by examiner

*Primary Examiner* — Dac V Ha
(74) *Attorney, Agent, or Firm* — Suiter Swantz pc llo

(57) ABSTRACT

A platform is provided which removes the need for the pilot to select between high angle and low angle antenna elements. By the automatic selection, the platform may improve BLOS connectivity during various phases of flight, such as during banking operations. The platform includes a SATCOM antenna including first and second elements. The platform also includes one or more SDRs which provide receive and transmit functions for the BLOS waveform. The platform may also include either a UHF diversity combiner or an LNA diplexer assembly. Thus, two methods are described for reducing out-of-service events for CDMA and legacy Narrowband UHF SATCOM.

14 Claims, 8 Drawing Sheets

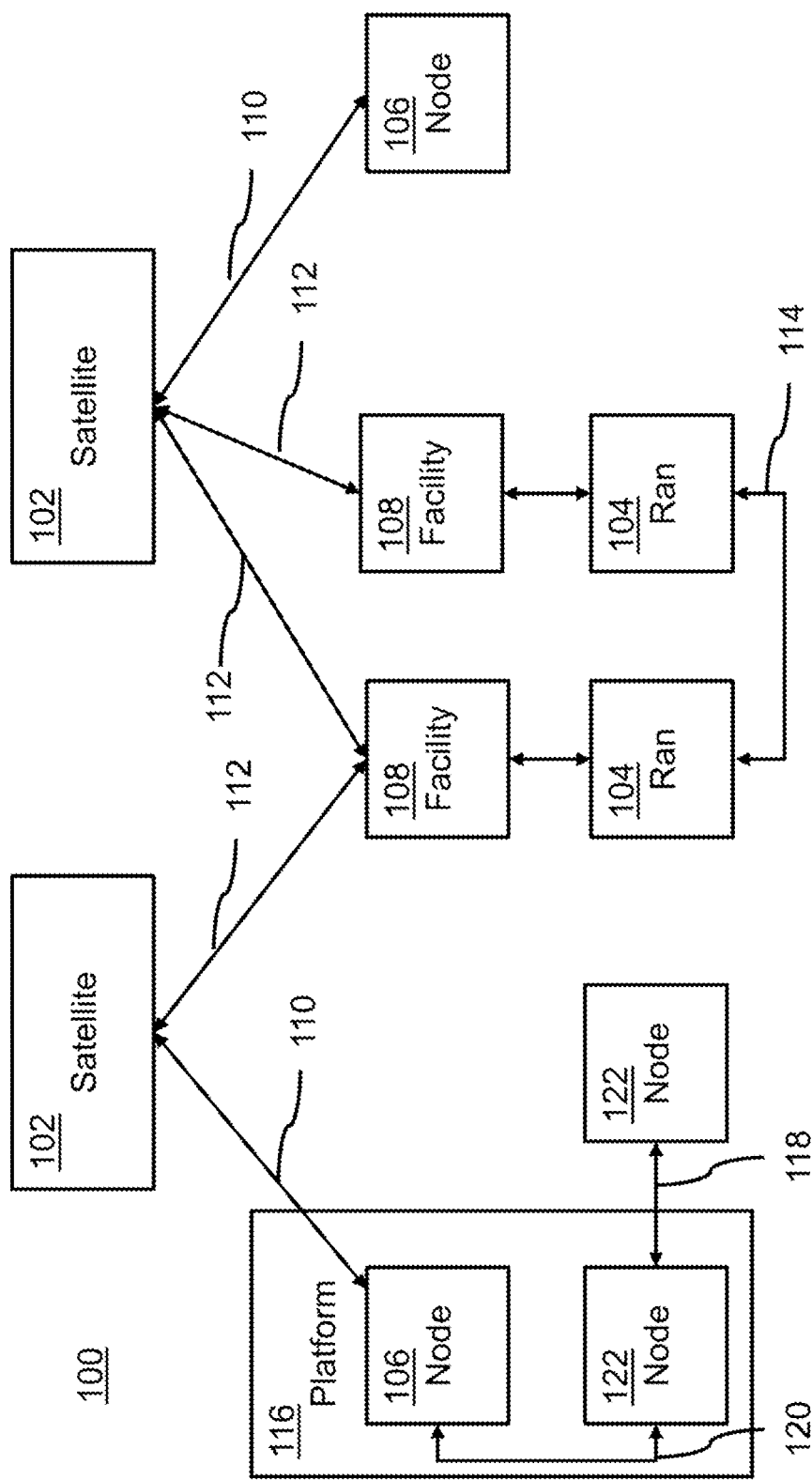

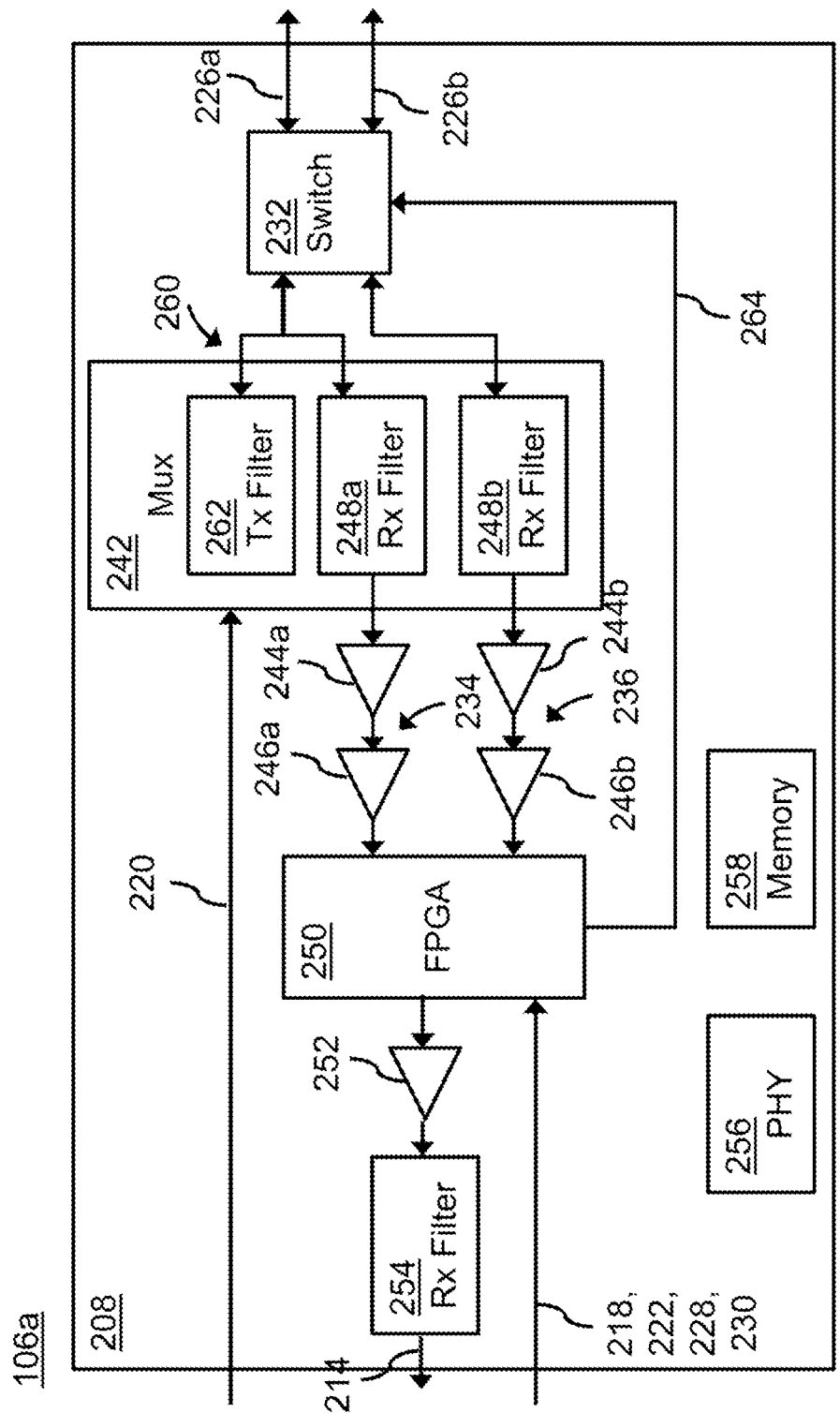

400

600

ANTENNA OPTIMIZATION FOR SATCOM WAVEFORMS

TECHNICAL FIELD

The present invention generally relates to communication systems, and more particularly to dual element antenna systems.

BACKGROUND

A number of aircraft with ultra-high frequency (UHF) satellite communication (SATCOM) terminals operate with a dual element SATCOM antenna. The dual element SATCOM antenna may include one high angle antenna element which provides zenith satellite views and one low angle antenna element which provides horizon satellite views. The selection of the high and low angle elements is performed by the pilot. Typically, the pilot selects the high or the low angle element based on the operating location of the aircraft relative to the satellite orbit location. A number of problems exist with the dual antenna elements. First, operator interaction is needed to make real time estimates for which antenna element to select. This human interaction is not feasible in a number of scenarios, such as during banking. Second, at medium elevation angles, between 30 to 50 degrees from horizon, a gain of the high angle and low angle antenna elements may be unoptimized. Third, modern satellite waveforms, such as Code Division Multiple Access (CDMA) modulated waveforms, expect precise antenna gain relationships between the transmit RF path and the receive RF path. In some instances, CDMA waveforms may declare an out of service (OOS) event due to link failure. The OOS event may cause the terminal to enter a link re-establishment phase. The link re-establishment phase may require thirty seconds or more, thus leading to service outages.

Phased antenna arrays provide one method of addressing appropriate element selection and improve antenna gain towards the satellite. However, replacing existing dual element SATCOM antenna with the phased antenna arrays may be cost prohibitive. Therefore, it would be advantageous to provide one or more of a device, system, or method that cures the shortcomings described above.

SUMMARY

Embodiments of the present disclosure are directed to a platform. In one embodiment, the platform includes a node. In another embodiment, the node includes a satellite communication (SATCOM) antenna configured to transmit and receive communications using a beyond line of sight (BLOS) waveform. In another embodiment, the SATCOM antenna includes a first antenna element and a second antenna element within a single physical structure. In another embodiment, the node includes a software-defined radio (SDR) configured to support transmit and receive communications using the BLOS waveform. In another embodiment, the BLOS waveform is in an ultra-high frequency (UHF) band and is a code-division multiple access (CDMA) direct sequence spread spectrum (DSSS) waveform. In another embodiment, the node includes a SATCOM radio frequency (RF) amplifier. In another embodiment, the node includes a UHF diversity combiner. In another embodiment, the UHF diversity combiner includes a radio frequency (RF) transfer switch. In another embodiment, the UHF diversity combiner includes a first receive path for analog signals from the first antenna element. In another embodiment, the first receive path includes a first analog band-pass filter, a first low-noise amplifier (LNA), and a first analog-to-digital converter (ADC). In another embodiment, the UHF diversity combiner includes a second receive path for analog signals from the second antenna element. In another embodiment, the second receive path includes a second analog band-pass filter, a second LNA, and a second ADC. In another embodiment, the UHF diversity combiner includes a processor configured to generate a combined digital signal by applying a phase offset and a weight factor to digital signals from the first receive path and the second receive path. In another embodiment, the UHF diversity combiner includes a digital-to-analog converter (DAC) coupled to the processor. In another embodiment, the UHF diversity combiner includes a transmit path for analog signals from the SATCOM RF amplifier, the transmit path including a third analog band-pass filter.

Embodiments of the present disclosure are also directed to a platform. In one embodiment, the platform includes a first node. In another embodiment, the first node includes a satellite communication (SATCOM) antenna configured to transmit and receive communications using a beyond line of sight (BLOS) waveform. In another embodiment, the SATCOM antenna includes a first antenna element and a second antenna element. In another embodiment, the first node includes a first software-defined radio (SDR) configured to support transmit and receive communications using the BLOS waveform. In another embodiment, the BLOS waveform is in an ultra-high frequency (UHF) band and is a code-division multiple access (CDMA) direct sequence spread spectrum (DSSS) waveform. In another embodiment, the first node includes a SATCOM radio frequency (RF) amplifier coupled to the first SDR. In another embodiment, the first node includes a low-noise amplifier (LNA) and diplexer assembly. In another embodiment, the LNA diplexer assembly includes a first receive path for analog signals from the first antenna element. In another embodiment, the first receive path including a first diplexer and a first LNA. In another embodiment, the first SDR is communicatively coupled to the first receive path. In another embodiment, the LNA diplexer assembly a second receive path for analog signals from the second antenna element. In another embodiment, the second receive path includes a second diplexer and a second LNA. In another embodiment, a second SDR is communicatively coupled to the second receive path. In another embodiment, the LNA diplexer assembly includes a first transmit path for analog signals from the SATCOM radio frequency (RF) amplifier. In another embodiment, the first transmit path includes an RF transfer switch and the first diplexer. In another embodiment, the first antenna element is communicatively coupled to the first transmit path. In another embodiment, the LNA diplexer assembly includes a second transmit path for analog signals from the SATCOM RF amplifier. In another embodiment, the second transmit path includes the RF transfer switch and the second diplexer. In another embodiment, the second antenna element is communicatively coupled to the second transmit path. In another embodiment, the platform includes a second node. In another embodiment, the second node includes a second SDR configured to support receive communications using the BLOS waveform and support transmit and receive communications using a half-duplex LOS waveform. In another embodiment, the second SDR is communicatively coupled to the first SDR by a physical interface. In another embodiment, the second SDR provides communication packets from the receive communications using the BLOS waveform to the first SDR by way of the physical interface.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1 depicts a simplified schematic view of a BLOS communication system, in accordance with one or more embodiments of the present disclosure.

FIG. 2B depicts a simplified schematic view of a UHF diversity combiner of the node of FIG. 2A, in accordance with one or more embodiments of the present disclosure.

DETAILED DESCRIPTION OF EXEMPLARY EMBODIMENTS

Figure 2A:
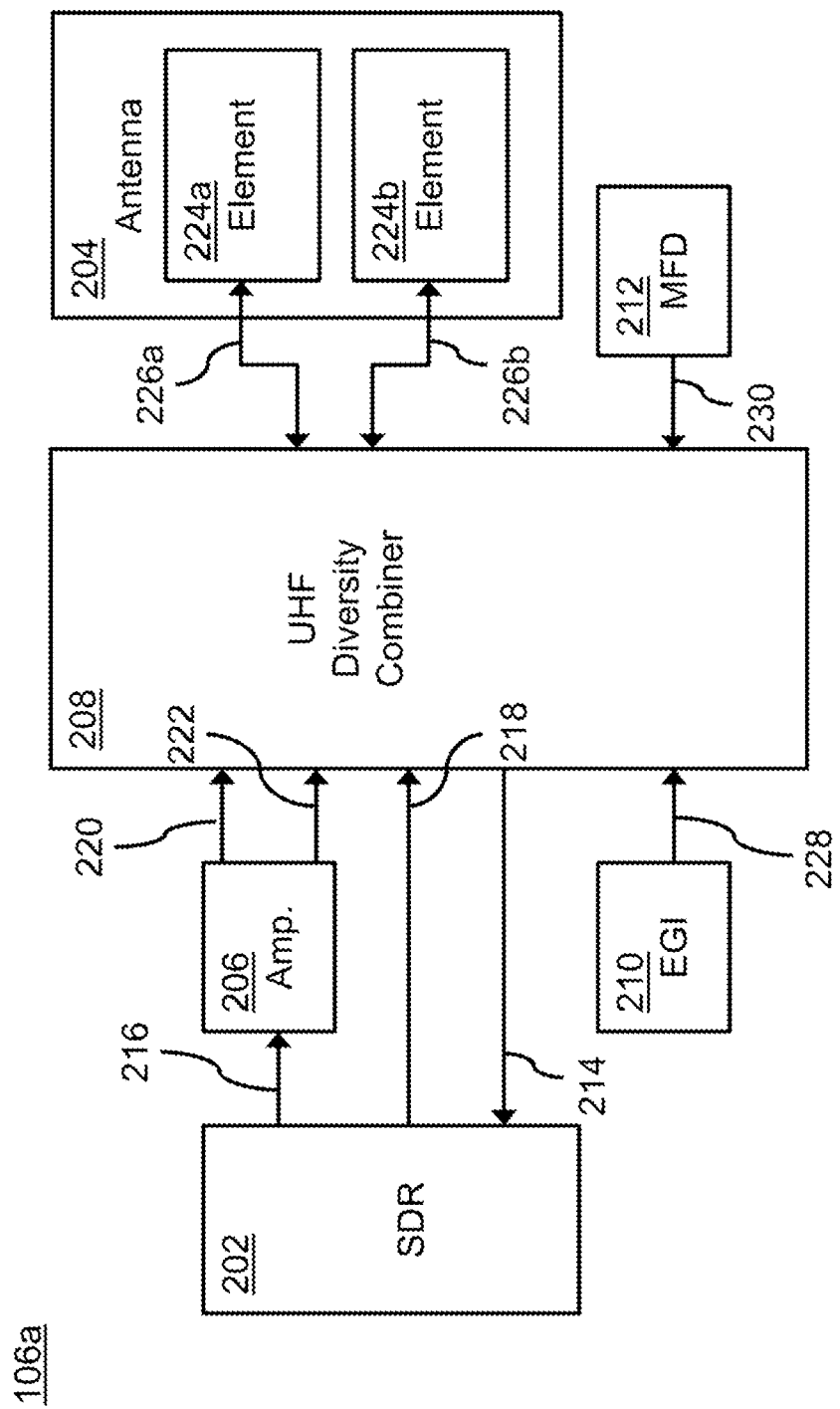
FIG. 2A depicts a simplified schematic view of a node of a platform, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive "or". For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

A radio communication system is described in U.S. Pat. No. 11,050,443, titled Beyond Line of Sight Waveform and Line of Sight Waveform Software-Defined Radio, naming John V. Thommana and Jeffrey Grundmeyer as inventors, which is incorporated herein by reference in the entirety.

Broadly, embodiments of the inventive concepts disclosed herein are direct to a UHF diversity combiner between a SATCOM terminal and a dual element antenna. The UHF diversity combiner processes both antenna elements simultaneously and independently. Receive transmissions for each antenna element is assigned to a respective channel. Each channel is digitally sampled, combined with phase adjustments, and then a signal weighting is applied. The signal weighting and phase alignment is based on a satellite view vector where antenna gain and the signal phase relationship is known for the antenna elements. The satellite view vector is calculated from the aircraft GPS position, satellite orbit location, and aircraft orientation from an inertial navigation system (INS). Advantageously, the diversity combiner may reduce or eliminate the operator interaction from selecting the high angle or low angle antenna element. The diversity combiner may also provide antenna gain for all upward facing orientations without requiring a phased array. The diversity combiner may provide receive gain compensation to operate with existing SATCOM terminals. The diversity combiner may mitigate or reduce OOS events.

Broadly, embodiments of the inventive concepts disclosed herein are also directed to coopting an auxiliary channel of a SDR to host a black side CDMA receive function, without compromising legacy LOS waveforms currently hosted on the main channel of the SDR radio, by a LNA diplexer assembly between the SDR and a dual element antenna. The LNA diplexer assembly switches CDMA receive communications from the two antenna elements between the first and second SDRs. The LNA diplexer assembly also switches a transmit waveform from the BLOS CDMA SDRs to selectively transmit from one of the two antenna elements. For example, a first SDR may be configured to transmit and receive communication by the BLOS CDMA waveform. A second SDR may be configured to receive communications by the BLOS waveform and also transmit and receive communications by a half-duplex line-of-sight (LOS) waveform.

Referring now to FIGS. 1, an exemplary embodiment of a system 100 according to the inventive concepts disclosed herein is depicted. The system 100 may be implemented as any suitable system, such as a network. The system 100 may include at least one satellite 102 (e.g., a UHF SATCOM Geostationary satellite), at least one radio access node (RAN) 104 (sometimes referred to as a base station or a ground station), at least one node 106 (e.g., CDMA satellite terminal node, a BLOS node), at least one radio access facility 108, and at least one node 122 (e.g., a LOS node), some or all of which may be communicatively coupled at any given time. The satellite's 102 antennas may form a plurality of beams configured to transmit signals to the RANs 104 and the nodes 106. For example, the nodes 106 may transmit and receive communication with the satellites 102 by a UHF band interface 110. By way of another example, the radio access facilities 108 may transmit and receive communications with the satellites 102 by a Ka band interface 112. By way of another example, the radio access network 104 may communicate with other radio access networks 104 by a fiber connection interface 114. Commonly, the node 106 communicates with another of the nodes 106 by double hop communication. Thus, for the node 106 to communicate with another of the node 106, the node 106 first communicates with the satellite 102 by the UHF band interface 110. The satellite 102 then communicates with the radio access facility 108 by the Ka band interface 112. The radio access facility 108 then routes the communication to the radio access network 104. The radio access network 104 then determines an appropriate radio access facility 108 for establishing communication with the desired node 106. If the desired node 106 is served by the current satellite 102 and/or the current radio access 108, the current facility 108 may uplink to the current satellite 102 and downlink to the desired node 106. If the desired node 106 is served by a second satellite or a second radio access network, the current radio access network 104 performs appropriate forwarding via the fiber connection interface 114.

In an exemplary embodiment, some or all of the satellites 102 may be configured to support a BLOS waveform. The BLOS waveform may be a slotted code-division multiple access (CDMA) direct sequence spread spectrum (DSSS) waveform. The CDMA waveform may have a 10-millisecond frame and each frame may have 15 slots. The CDMA waveform may be a military waveform. For example, two 40 MHz portions of spectrum may be allocated, with one portion for transmit and the other for receive, and the two portions may be separated by a 20 MHz guard band. The CDMA waveform may use a 5-megahertz (MHz) bandwidth. A CDMA satellite may be configured to communicate with a BLOS SDR of the node 106 and at least one RAN 104.

In some embodiments, the node 106 is a multi-waveform node. In this regard, the node 106 may communicate using one waveform at a time, but may communicate using different waveforms protocols. The node 106 may be hosted on a platform 116 which includes multiple nodes, such as the node 106 and a node 122. As may be understood, the node 106 and the node 122 may be similar. However, the node 106 may be configured to host the UHF band interface (e.g., BLOS communications) and the node 122 may be configured to host a LOS band interface 118 (e.g., LOS communications). The LOS band interface 118 may include a LOS waveform including a half-duplex waveform which uses relatively fewer processing resources, as compared to the processing resources necessary for the BLOS waveform. Due to the half-duplex nature, both transmit and receive communications for the LOS waveform may be housed on one channel of a radio of the node 122. The LOS waveform may include, but is not limited to, AM/FM, Single Channel Ground and Airborne Radio System (SINCGARS), HaveQuick (HQ), Second Generation Anti jam Tactical UHF Radio for NATO (SATURN), Soldier Radio Waveform (SRW), and the like. As may be understood, the LOS waveform may occupy a range of bandwidths, such as, but not limited to, a narrowband 25 kHz bandwidth or wideband bandwidth of 1.2 megahertz (MHz), 5 MHz, 10 MHz, or 32 MHz. By the LOS band interface 118, the node 122 may communicate with another of the nodes 122. The node 122 may also be communicatively coupled to the node 106 by a physical interface 120 located on the platform 116. Thus, communication from the node 106 of the platform 116 may be routed to LOS nodes and BLOS nodes. As will be described with reference to FIGS. 5A-6, processing resources from the node 122 may also be coopted to host and process the CDMA receive channel of the BLOS band interface 110 for improving a stability of the UHF band interface 110.

The platform 116 may be any suitable platform, such as a vehicle (e.g., an aircraft, a watercraft, a submersible craft, an automobile, a spacecraft, a satellite, and/or a train) or a manpack. Thus, the platform 116 may be a mobile platform.

Referring now to FIGS. 2A-2B, an exemplary embodiments of a node 106a of the platform 116 is described, in accordance with one or more embodiments of the present disclosure. For example, as shown in FIG. 2A, the node 106a may include a SDR 202, a SATCOM RF amplifier 206, a SATCOM antenna 204, and an ultra-high frequency (UHF) diversity combiner 208, and, some or all of which may be communicatively coupled at any given time. In some embodiments, the node 106a may further include an embedded global positioning system (GPS) inertial navigation system (INS) (also known as EGI) 210. In some embodiments, the node 106a may further include a multi-function display (MFD) 212. The EGI 210 and the MFD 212 may be communicatively coupled to the UHF diversity combiner 208.

The SDR 202 may be configured to communicate over one or more channels by using the CDMA waveform. The SDR 202 may be configured to support transmitting and receiving encrypted communications by the SATCOM antenna 204, such communications being sent to or received from the satellite 102, RAN 104, or an additional node (e.g., by way of the UHF band interface 110 of FIG. 1). In particular, the SDR 202 may be configured to support at least one channel of full-duplex communications, which may include a receive channel 214 and a transmit channel 216. As may be understood, the SDR 202 may include any SDR known in the art, such as, but not limited to, an ARC-210 SDR and the like. In this regard, the SDR 202 may further include a number of components which are not depicted, such as, but not limited to, modems, transceiver systems, information security (INFOSEC) systems, and the like, some or all of which may be communicatively coupled at any given time.

The SDR 202 may receive digital communications from the UHF diversity combiner 208 on the receive channel 214 and transmit digital communications to the SATCOM RF AMPLIFIER 206 on the transmit channel 216. The SDR 202 may further provide a signal indicative of the receive channel frequency 218 to the UHF diversity combiner 208. In some instances, the CDMA transmit functions are hosted on a main channel of the SDR 202 and CDMA receive functions are hosted on an auxiliary channel of the SDR 202.

The SATCOM RF amplifier 206 may be a relatively high-power amplifier. In this regard, SATCOM RF amplifier 206 may amplify analog transmit signals from the SDR 202 for transmission by the SATCOM antenna 204. In some instances, the amplified transmit signal 220 is routed to the SATCOM antenna 204 by way of the UHF diversity combiner 208. The SATCOM RF amplifier 206 may also provide a transmit signal blanking indicator 222 to the UHF diversity combiner.

Figure 3:
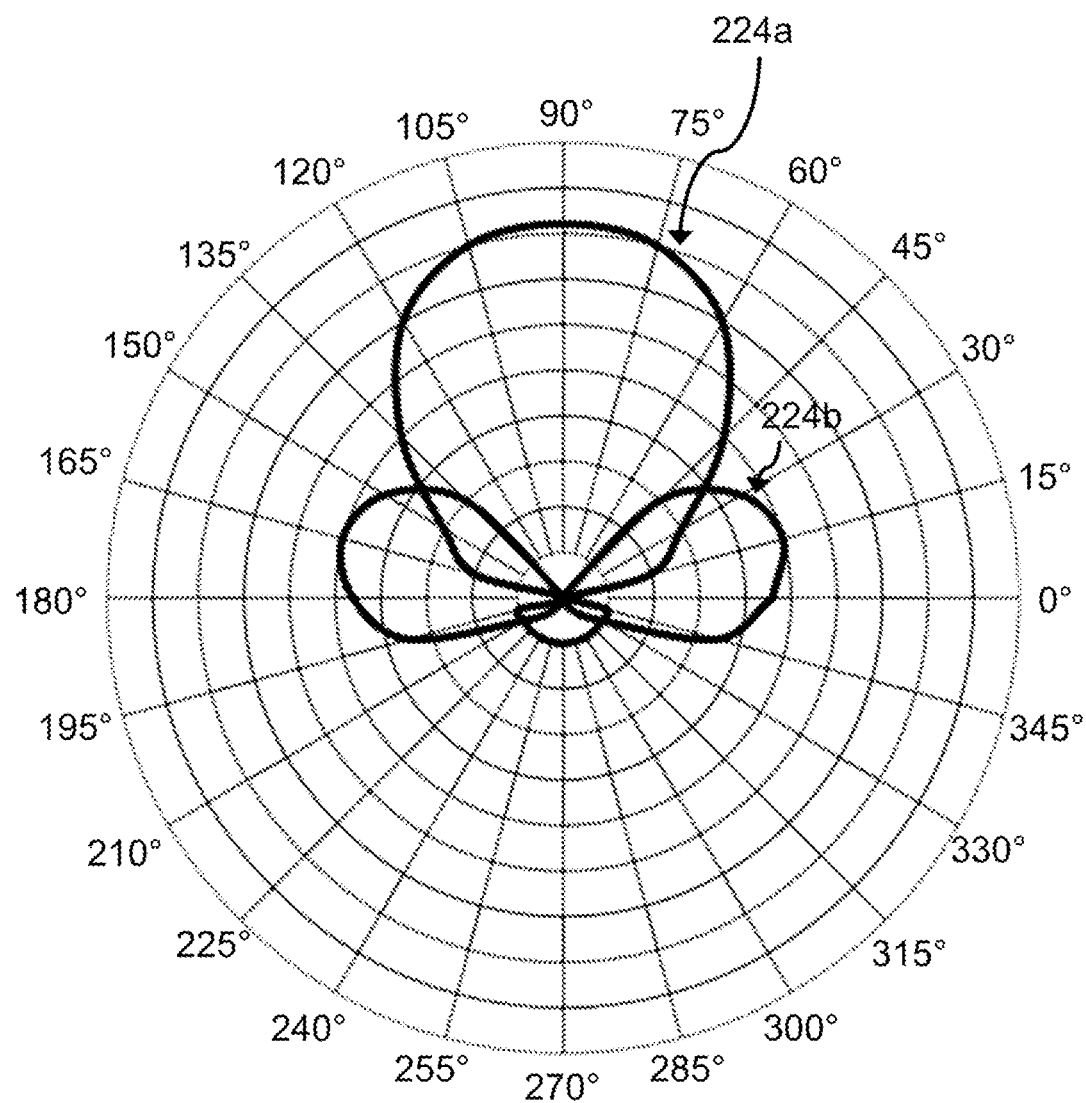
FIG. 3 depicts an exemplary UHF SATCOM antenna pattern, in accordance with one or more embodiments of the present disclosure.

The SATCOM antenna 204 may include one or more antenna elements 224. The antenna elements 224 may receive and transmit BLOS waveforms. For example, the SATCOM antenna 204 may include a first antenna element 224a and a second antenna element 224b. In this regard, the SATCOM antenna 204 may be considered a dual-element SATCOM antenna. The first antenna element 224a may include any type of antenna element which is suitable for zenith or high angle communications, such as, but not limited to, a crossed dipole antenna provided with a high angle view for zenith communications. Gain of the first antenna element 224a may be reduced from the maximum zenith gain satellite look angle increases from zenith. As axial ratio is increased the antenna is effectively made into a horizontally polarized linear antenna. In particular, the gain of the high angle element may be reduced from the maximum zenith gain at medium elevation angles between 30 to 50 degrees above horizon. The second antenna element 224b may include any type of antenna element which is suitable for horizon or low angle communications, such as, but not limited to, a monopole antenna provided with a low angle view for horizon communications. The second antenna element 208b may include a maximum gain which is below 50 degrees elevation. An exemplary antenna pattern for the first antenna element 224a and the second antenna element 224b is depicted in FIG. 3.

The antenna elements 224 may be coupled to the UHF diversity combiner 208. The antenna elements 224 may generate analog signals 226 in response to receiving the BLOS waveform and provide the analog signals 226 to the UHF diversity combiner 208 (e.g., receive, Rx). The antenna elements 224 may also receive the analog signals 226 from the UHF diversity combiner 208 and generate the BLOS waveform in response (e.g., transmit, Tx). In this regard, the antenna elements may share a common transmit and receive path with the UHF diversity combiner 208. For example, first analog signals 226a may pass between the antenna element 224a and the UHF diversity combiner 208. By way of another example, second analog signals 226b may pass between the antenna element 224a and the UHF diversity combiner 208.

In some instances, the UHF diversity combiner 208 is further provided with information for combining the first analog signals 226a and the second analog signals 226b. For example, the EGI 210 may provide the UHF diversity combiner 208 with aircraft position and attitude information 228. By way of another example, the MFD 212 may provide the UHF diversity combiner 208 with satellite orbit location information 230. The UHF diversity combiner may then use the aircraft position and attitude information 228 and the satellite orbit location information 230 to determine a satellite view vector. It is further contemplated that the UHF diversity combiner 208 may receive the satellite view vector from one or more of the EGI 210, the MFD 212, or a processor which is not housed in common housing of the UHF diversity combiner 208 (e.g., a line-replaceable unit (LRU) or integrated modular avionics (IMA) cabinet).

As shown in FIG. 2B, the UHF diversity combiner 208 may include a number of components, such as, but not limited to, a radio frequency (RF) transfer switch 232, a first receive path 234, a second receive path 236, a processor 238, a digital-to-analog converter (DAC) 240, and a multiplexer (Mux) 242. In some instances, the first receive path 234 and the second receive path 236 are routed from the RF transfer switch 232 through a number of components of the UHF diversity combiner 208, such as, but not limited to the multiplexer (Mux) 242 (e.g., an analog band-pass filter 248), a low-noise amplifier (LNA) 244, or an analog-to-digital converter (ADC) 246. For example, the first receive path 234 may be provided for receiving the analog signals 226a from the first antenna element 224a. The first receive path 234 may include a first analog band-pass filter 248a, a first LNA 244, and a first ADC 246. By way of another example, a second receive path 236 for analog signals from the second antenna element, the second receive path including a second analog band-pass filter 248b, a second LNA 244b, and a second ADC 246b. Thus, the UHF diversity combiner may independently and simultaneously filter, amplify, and then digitally convert analog signals from the first antenna element 224a and the second antenna element 224b simultaneously and independently to generate digital signals by the first receive path 234 and the second receive path 236.

The UHF diversity combiner 208 may further include a transmit path 260. The transmit path 260 may route the amplified transmit signal 220 from the SATCOM RF amplifier 206, through a number of components of the UHF diversity combiner 208, such as, but not limited to a multiplexer (Mux) 242 (e.g., an analog band-pass filter 262), to the RF transfer switch 232. As depicted in FIG. 2B, the transmit path 260 and the first receive path 234 may share a common path between the multiplexer (Mux) 242 and the switch 232. For transmit functions, transmissions are made out of one of the high angle path or the low angle path. The processor 250 may include a transmit function by which the processor selects the high angle path or the low angle path based on satellite location and transmits an antenna element switch control signal 264 to the RF transfer switch, causing the RF transfer switch 232 to switch the transmit signal between the antenna element 224a and the antenna element 224b.

The RF transfer switch 232 may include, but is not limited to, a PIN diode RF transfer switch. The PIN diode RF transfer switch may include any PIN diode known in the art, such as, but not limited to an intrinsic region (I) between a p-type semiconductor (P) and an n-type semiconductor (N). The PIN diode RF transfer switch may be fast enough to switch between the low angle channel and the high angle channel during dead periods within the BLOS SATCOM waveform. In some instances, the PIN diode RF switch may handle 100 watts, which may be a requirement for transmitting the SATCOM RF waveform by the SATCOM antenna 204. Thus, the RF transfer switch 232 may maintain paths for receive signals and transmit signals, allowing the antenna to handle both transmit and receive. Furthermore, the RF transfer switch 232 allows the high angle path and the low angle path to each be active independently.

The UHF diversity combiner 208 may further include one or more processor(s) 250. The processor(s) 250 may include any processing unit known in the art. For example, the processor(s) 250 may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) 250 may include any microprocessor-type device configured to execute software algorithms and/or instructions. In general, the term "processor" may be broadly defined to encompass any device having one or more processing elements, which execute program instructions from memory, from firmware (e.g., very high-speed integrated circuits program (VHSIC) hardware description language (VHDL)), or by hardware implemented functions. It should be recognized that the steps described throughout the present disclosure may be carried out by the processor(s) 250.

The processor(s) 250 may be coupled to the first receive path 234 and the second receive path 236, for receiving the digital signals. The processor(s) 250 are further configured to generate a combined digital signal by applying a phase offset and a weight factor to the digital signals from the first receive path 234 and the second receive path 236. By applying the phase offset and weighting factor to the digital signals, a combined digital signal may be generated which includes a signal to noise ratio which is improved over the digital signals. Furthermore, the combined digital signal may result in optimal antenna gain performance from horizon to zenith without any need for pilot intervention of antenna switching, which is especially useful during banking operations. Thus, the UHF diversity combiner 208 may process both antenna elements simultaneously and independently. Each channel is digitally sampled, combined with phase adjustment and signal weighting applied based on the satellite view vector and antenna phase correlation between elements.

The combined digital signal may be generated according to the equation: $s(t)=W_{HA}*S_{HA}(t)+W_{LA}*S_{LA}(t-t_d)$ Where s(t) is the combined or composite digital signal in the time domain (t); $W_{HA}$ is the weight of the high angle antenna element; $S_{HA}(t)$ is digitized signal of the high angle element in the time domain; $W_{LA}$ is the weight of the low angle antenna element; $S_{LA}(t-t_d)$ is the time compensated digitized signal of the low angle element in the time domain; and $t_d$ is a time compensation factor based on the phase difference between the high angle and low angle antenna elements for antenna θ and φ. The weight (W) of the high angle and low angle antenna elements may be calculated based on a characterization of antenna at various directions. For example, a lookup table stored in memory may include the weights for a given number of degrees (e.g., 5) for antenna θ and φ.

The processor(s) 250 may determine the phase offset and the weight factor based on phase and gain relationship data stored in memory 258. In some instances, the phase and gain relationship data are measured at 5 degree increments for both phi and theta. The processor(s) 250 may further determine the phase offset and the weight factor based on a satellite view vector. In some instances, the processor(s) 250 compute the satellite view vector based on the aircraft position and attitude information 228 and based on the satellite orbit location information 230. In this regard, the processor(s) 250 may receive the aircraft position and attitude information 228 from the EGI 210 and receive the satellite orbit location information 230 from the MFD 212.

By the UHF diversity combiner 208, the receive signal strength can be improved by up to 3 dB at certain elevation angles, such as 40 degrees above horizon. The improvement in the receive signal strength may results in a higher signal power on the receive path that is not reciprocal on the transmit path. The processor(s) 250 may compensate for the higher signal power on the receive path by artificially reducing receive signal strength on the receive path as presented to the SDR 202, yet maintaining nearly the same S/N. This is because the gain of the receive LNA stage is much higher than the noise figure of the downstream SATCOM terminal receiver. This allows the SDR 202 to process the receive signal and determine the appropriate correct open loop transmit power based on the antenna element selected.

In some embodiments, receive gain can also apply gain correction due to temperature effects in the (antenna) unit. In this regard, a temperature sensor (not depicted) may measure a temperature each antenna unit and provide the measurements to the processor(s) 250. The processor(s) 250 may then apply gain compensation to one or more of the digital receive signals based on the temperature measurements. Similarly, the processor(s) may compensate for the receive gain due to differences between transmit and receive frequency bands in the antenna.

CDMA waveforms may include periodic blanking for various purposes, such as transmit scanning during a measurement cycle. The processor(s) 250 may receive signal blanking information, such as the transmit signal blanking indicator 222 (e.g., from the SATCOM RF amplifier 206) and receive channel frequency 218 (e.g., from the SDR 202). Using the transmit signal blanking indicator 222 and the receive channel frequency 218, the processor(s) 250 may monitor waveform periodic blanking of the BLOS waveform and cause the RF transfer switch 232 to switch during blanked periods of the transmit and receive waveforms. By causing the RF transfer switch 232 to switch during blanked periods of the transmit and receive waveforms a loss of transmit and receive data may be minimized. The processor 250 may monitor waveform periodic blanking based on the transmit signal blanking indicator 222 and the receive channel frequency 218. Switching the transmit path 260 to the optimal antenna element can be managed by the processor(s) 250, because the satellite view vector is computed and known in the unit. The transmit path is less critical because lower antenna gain can be compensated for with high transmit power out of the RF SATCOM amplifier 206. Receive G/T performance is typically the limited factor, which is limited to antenna gain. Thus, the processor 250 may determine which antenna element 224 to use based on satellite vector.

The UHF diversity combiner 208 may further include a memory 258. The memory may be communicatively coupled to the processor(s) 250. The memory 258 may include any storage medium known in the art. For example, the memory 258 may include a non-transitory memory medium. For instance, the memory 258 may include, but is not limited to, a read-only memory (ROM), a random-access memory (RAM), a magnetic or optical memory device (e.g., disk), a solid-state drive and the like. It is further noted that memory 258 may be housed in a common controller housing with the one or more processor(s) 250. In an alternative embodiment, the memory 258 may be located remotely with respect to the physical location of the processor(s) 250. In another embodiment, the memory 258 maintains program instructions for causing the processor(s) 250 to carry out the various steps described through the present disclosure. The memory 258 may also maintain various information, such as, but not limited to, unit gain calibration data as a function of temperature, dual element antenna receive band phase/gain correlation data, antenna element transmit/receive gain delta data.

The UHF diversity combiner 208 also includes a digital-to-analog converter (DAC) 252 coupled to the processor. The DAC 252 may receive the combined digital signal and convert the combined digital signal to an analog signal. In some embodiments, the UHF diversity combiner 208 may optionally include an analog band-pass filter 254 between the DAC 252 and the SDR 202, for performing a final filtering step. Thus, a receive path may be provided from the antenna elements 224 to the SDR 202 by way of one or more components of the UHF diversity combiner 208.

As may be understood, analog band-pass filters 248, 254, 262 may filter each antenna element signal. The band-pass range may be selected based upon the type of the BLOS waveform. The transmit filter and the receive filters may include any analog filters, such as passive filters. In some instances, the bands of the filters are tuned to UHF SATCOM bands. For example, where the UHF SATCOM is a UHF CDMA waveform (e.g., operating in a frequency plan A, operating in a frequency plan B), the receive filters may pass analog signals between 340 and 380 MHz and the transmit filter may pass analog signals between 280 and 320 MHz. Due to the SATCOM RF amplifier 206 providing adequate transmit signal gain, only one transmit filter may be needed. In this regard, the transmit signal may only be sent over one antenna element while meeting a desired gain. However, the receive gain may be limited by noise level, such that splitting the receive signals into separate paths is desirable.

The UHF diversity combiner 208 may further include a physical network interface 256. The physical interface may include any standard interface, such as, but not limited to, ARINC 429, ARINC-664, ethernet, AFDX, serial, CAN, TTP, Military Standard (MIL-STD) 1553, peripheral component interconnect (PCI) express, digital interfaces, analog interfaces, discrete interfaces, or the like. The physical network interface 256 (also referred to as input/output (I/O) or PHY) may allow the UHF diversity combiner 208 to interface with various components of the node 106a. For example, the physical network interface 256 may be communicatively coupled with the processor(s) 250.

The physical network interface 256 may also be configured to communicatively coupled the processor(s) 250 with an avionics network. In this regard, signals received by the processor(s) 250 (e.g., digital signals) may be distributed to the avionics network. Although the processor(s) 250 have been described as performing one or more processing functions on the digital signals, this is not intended as a limitation of the present disclosure. It is further contemplated that the processing functions on the digital signals may be performed by one or more separate processors coupled to the avionics network. For example, the separate processors may be housed within a line-replaceable unit (LRU) or an integrated modular avionics (IMA) cabinet.

Figure 4:
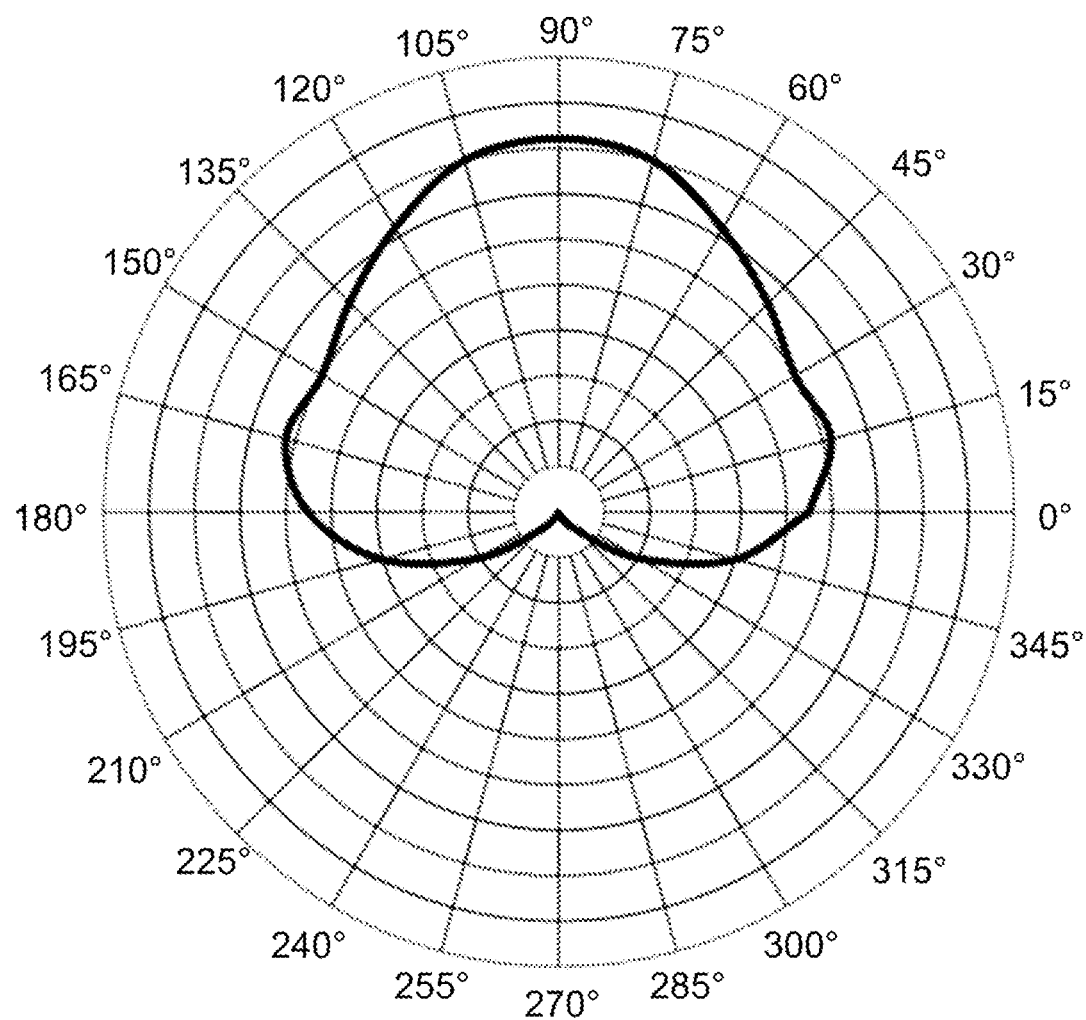
FIG. 4 depicts an exemplary UHF SATCOM antenna pattern due to a UHF diversity combiner being applied to the UHF SATCOM antenna pattern of FIG. 3, in accordance with one or more embodiments of the present disclosure.

Referring now to FIGS. 3-4, a UHF SATCOM antenna pattern 300 and a UHF SATCOM antenna pattern 400 are described, in accordance with one or more embodiments of the present disclosure. The UHF SATCOM antenna pattern 300 may indicate that the antenna element 224a is suitable for high angle receptions but loses gain at medium elevation angles between 30 to 50 degrees above horizon. The UHF SATCOM antenna pattern 300 may further indicate the antenna element 224b is suitable for low angle receptions, increasing below 50 degrees elevation above horizon.

The UHF SATCOM antenna pattern 400 depicts the signal after using the UHF diversity combiner 208. As depicted, the UHF SATCOM antenna pattern 400 may include improved receive antenna gain in the 30-to-50-degree region. For example, when the BLOS waveform is received at a 40-degree elevation above horizon, the UHF diversity combiner may provide a gain of up to 3 dB signal to noise ratio (S/N) higher than the analog signals from the antenna elements 224. At near zenith vectors, the high angle element signal strength will dominate, and maximum weighting will be applied to the high angle path signal. At low elevation vectors, the low angle element signal strength will dominate, and maximum weighting will be applied to the low angle path signal. However, when both path signal are of similar amplitude, e.g., at 40 degrees elevation, signals will be combined with weighting and with phase compensation to one path to achieve up to a 3 dB S/N improvement over a single element. The 3 dB S/N improvement may be for the processed analog signal which is output to the SATCOM terminal.

Figure 5A:
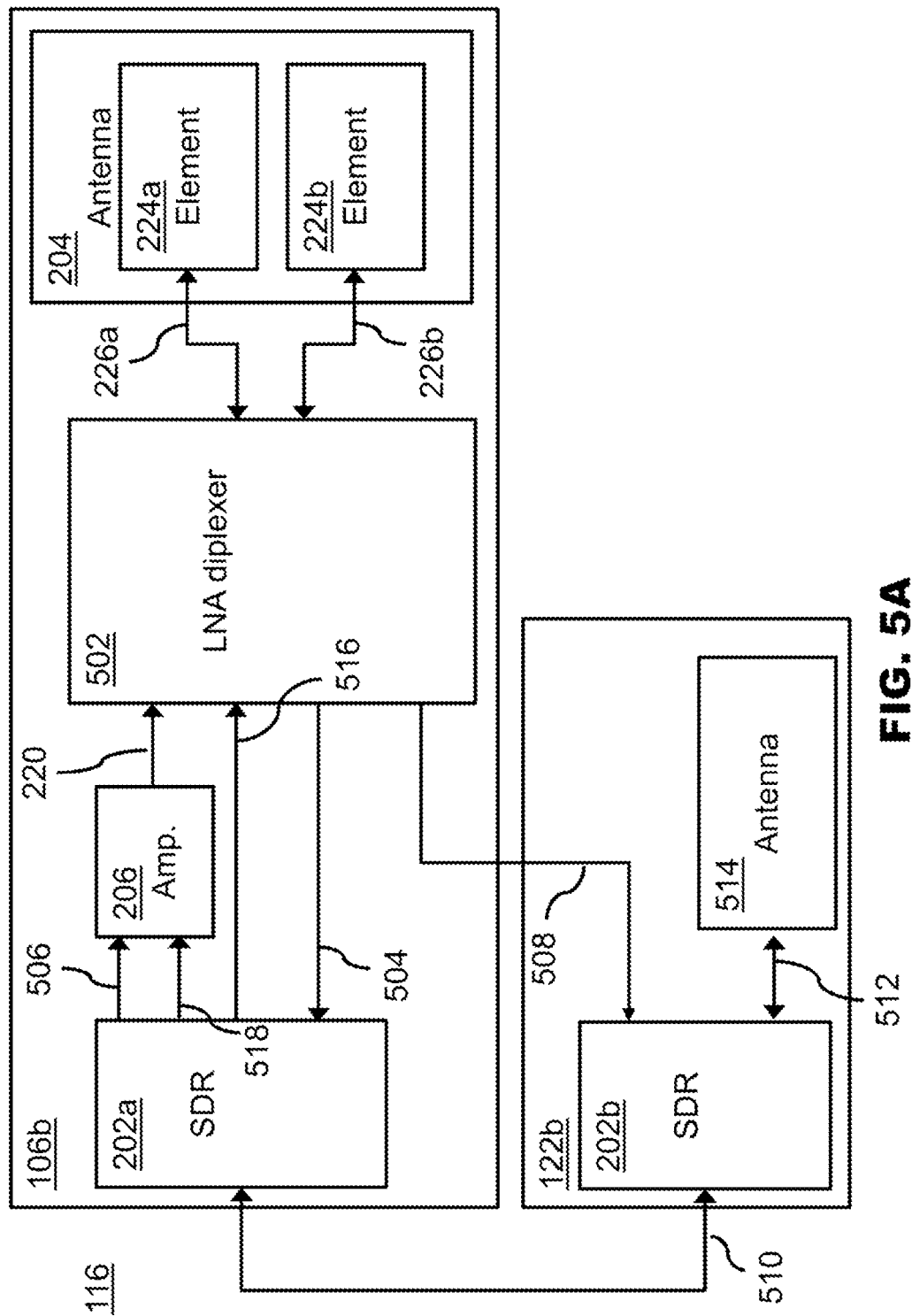
FIG. 5A depicts a simplified schematic view of a platform including two nodes, in accordance with one or more embodiments of the present disclosure.
Figure 5B:
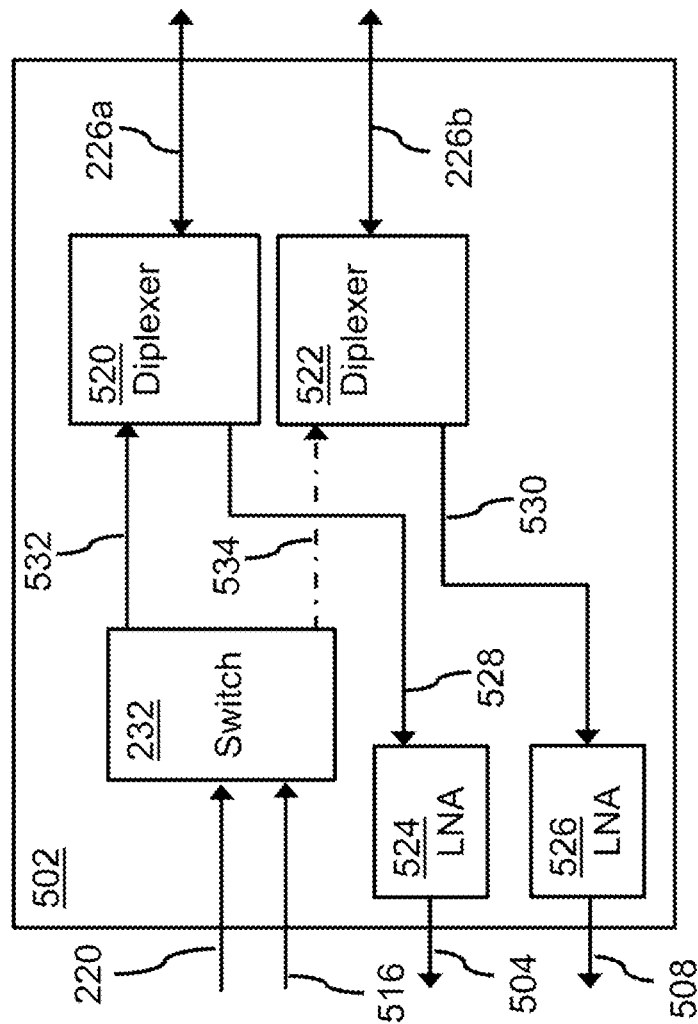
FIG. 5B depicts a simplified schematic view of a LNA diplexer assembly of a BLOS node of the nodes of FIG. 5A, in accordance with one or more embodiments of the present disclosure.

Referring now to FIGS. 5A-5B, an exemplary embodiment of the platform 116 including a node 106b and a node 122b of the system 100 of FIG. 1 is described, according to one or more embodiments of the present disclosure. The platform 116 may include two SDRs 202 (e.g., SDR 202a, SDR 202b) collectively configured to support three channels of a duplex waveform (e.g., a transmit channel and two receive channels) and two channels of a half-duplex waveform (e.g., a transmit channel and a receive channel). For example, the node 106b may include the SDR 202a and the node 122b may include the SDR 202b. The SDR 202a may support the transmit channel and one of the receive channels of the duplex waveform. The SDR 202b may support a second of the receive channels of the duplex waveform and both the transmit and receive channel of the half-duplex waveform. The platform 116 may further include the SATCOM RF amplifier 206 and the SATCOM antenna 204, including the first antenna element 224 and the second antenna element 224b. For example, the node 106b may include the SATCOM RF amplifier 206 and the SATCOM antenna 204. The SATCOM antenna 204 may communicatively couple the node 106b with various components of the system 100 by way of the UHF band interface 110 (see FIG. 1). In some embodiments, the platform 116 further includes a LNA diplexer assembly 502. For example, the node 106b may include the LNA diplexer assembly 502. The platform 116 may further include a secondary antenna 514 for LOS communications. For example, the node 122b may include the secondary antenna 514. The secondary antenna 514 may communicatively couple the node 122b with various components of the system 100 by way of the LOS band interface 118 (see FIG. 1).

For example, the SDR 202a may include a receive channel path 504 supporting receive communications from signals received of the duplex waveform from the first antenna element 224a of the SATCOM antenna 204. The SDR 202a may also include a transmit channel path 506 supporting transmit communications for the duplex waveform by one of the first antenna element 224a or the second antenna element 224b. The SDR 202b may include a receive channel path 508 supporting receive communications from signals received from the second antenna element 224b. Thus, signals from the high angle antenna element may be supported by one SDR and signals from the low angle antenna element may be supported by a second SDR.

The platform 116 may also include a physical interface 510. The physical interface 510 may communicatively couple the SDR 202a and the SDR 202b. The physical interface 510 may include any interface known in the art, such as, but not limited to ARINC 429, ARINC-664, ethernet, AFDX, serial, CAN, TTP, Military Standard (MIL-STD) 1553, peripheral component interconnect (PCI) express, digital interfaces, analog interfaces, discrete interfaces, or the like.

The SDR 202b may then forward or provide the receive communications (e.g., data packets) received from the antenna element 224b to the SDR 202a by way of the physical interface 510. The SDR 202a may collect packets from both the antenna element 224a and the antenna element 224b. Where the packets from the antenna element 224a are available, the SDR 202a may discard the packets from the antenna element 224b. The collected data packets may then be provided to a cryptography subsystem of the SDR 202a for decryption and further processing. Thus, processing resources from the SDR 202b may be coopted to support the BLOS receive waveform from two antenna elements. The simultaneous processing of the high angle and low angle antenna for receive ensures that packets are lost only if both the receive chains are unable to receive the packet correctly.

In some embodiments, the SDR 202a may declare an out-of-service (OOS) event upon failing to collect communication packets from both of the first antenna element 224a and the second antenna element 224b, such that neither receive link is receiving BLOS SATCOM communications. For example, the SDR 202a may include an OOS subsystem to declare the OOS event.

The SDR 202b may further include a transmit and receive channel path 512 supporting both transmit and receive channel communications for a half-duplex waveform from a secondary antenna 514. Airborne nodes may use ARC-210 radios for LOS waveforms. The LOS waveforms are half-duplex, such that a main channel of the ARC-210 may host both transmit and receive communication functions for the LOS waveform. Thus, the ARC-210 radios may include an auxiliary channel which may be used for hosting the receive functions for the antenna element 224b. In some instances, the auxiliary channel of the SDR 202b may host the black side CDMA receive function (e.g., encrypted but non-classified public) without compromising the functioning of the LOS waveform. Furthermore, the SDR 202b may host the CDMA receive channel functions on the auxiliary channel without increasing a required number of SDRs on the airborne node.

The LOS waveform may be a half-duplex waveform and may use a narrowband 25 kHz bandwidth or wideband bandwidth of 1.2 megahertz (MHz), 5 MHz, 10 MHz, or 32 MHz. For example, the LOS waveform may be Single Channel Ground and Airborne Radio System (SINCGARS), HaveQuick (HQ), Second Generation Anti-jam Tactical UHF Radio for NATO (SATURN), or Soldier Radio Waveform (SRW).

The secondary antenna 514 may include, but is not limited to a UHF antenna or a VHF antenna. The secondary antenna 514 may provide for LOS communications (e.g., with the RAN 104) by the LOS waveform.

The SDR 202a may also provide an antenna element switch control signal 516 to the LNA diplexer 502 (e.g., to an RF transfer switch), causing the RF transfer switch to switch the transmit signal 220 between the antenna element 224a and the antenna element 224b. The SDR 202a may determine the antenna element switch control signal 516 based on satellite view vector and a transmit signal blanking indicator. The SDR 202a may also provide a control signal 518 to the SATCOM RF amplifier 206. The control signal 518 may cause the SATCOM RF amplifier 206 to compensate for lower transmit antenna gain.

Referring now to FIG. 5B, the LNA diplexer 502 of the node 106b is described in accordance with one or more embodiments of the present disclosure. The LNA diplexer 502 may provide a receive communication path from the antenna element 224a to the SDR 202a and a receive communication path from the antenna element 224b to the SDR 202b. The LNA diplexer 502 may further provide a transmit communication path from the SATCOM RF amplifier to both the antenna element 224a and the antenna element 224b. The LNA diplexer 502 may include a number of components, such as, but not limited to, the radio frequency (RF) transfer switch 232, a first diplexer 520, a second diplexer 522, a first LNA 524, and a second LNA 526, some or all of which may be communicatively coupled at any given time. The LNA diplexer 502 may include one or more paths which connect the SATCOM antenna 204 with the SDR 202a and the SDR 202b. The paths may be routed through a number of the components of the LNA diplexer 502.

The LNA diplexer 502 may include a first receive path 528 and a second receive path 530. For example, the first receive path 528 may be provided for receiving the analog signals 226a from the first antenna element 224a. The first receive path 528 may including the first diplexer 520 and the first LNA 524. The first receive path 528 may further be communicatively coupled to the first SDR 202a by the receive channel path 504. By way of another example, a second receive path 530 may be provided for receiving the analog signals 226b from the second antenna element 224b. The second receive path 530 may include the second diplexer 522 and the second LNA 526. The second receive path 530 may further be communicatively coupled to the second SDR 202b by the receive channel path 508. Thus, the LNA diplexer 502 may allow the first SDR 202a to receive communication packets from the antenna 224a and allow the second SDR 202b to receive communication packets from the antenna 224b.

The LNA diplexer 502 may also include a first transmit path 532 and a second transmit path 534. The antenna element switch control signal 516 and the amplified transmit signal 220 may be received by the RF transfer switch 232. The RF transfer switch 232 may then selectively provide the amplified transmit signal 220 on one of the first transmit path 532 or the second transmit path 534 in response to the antenna element switch control signal 516. For example, the first transmit path 532 may be provided for transmitting the analog signals 220 from the SATCOM radio frequency (RF)

amplifier 206. The first transmit path 532 may include the RF transfer switch 232 and the first diplexer 520. The analog signals 220 may then be provided from the first transmit path 532 to the first antenna element 224a by a communicative coupling between the diplexer 520 and the first antenna element 224a. By way of another example, the second transmit path 534 may be provided for transmitting the analog signals 220 from the SATCOM radio frequency (RF) amplifier 206. The second transmit path 534 may include the RF transfer switch 232 and the second diplexer 522. The analog signals 220 may then be provided from the second transmit path 534 to the second antenna element 224b by a communicative coupling between the diplexer 522 and the second antenna element 224b. Thus, the LNA diplexer 502 may selective transmission from either the antenna element 224a or the antenna element 224b.

As depicted in FIG. 5B, a portion of the second transmit path 534 is provided with a dashed line type. This is not intended to be limiting, and is merely provided for clarity purposes.

Figure 6:
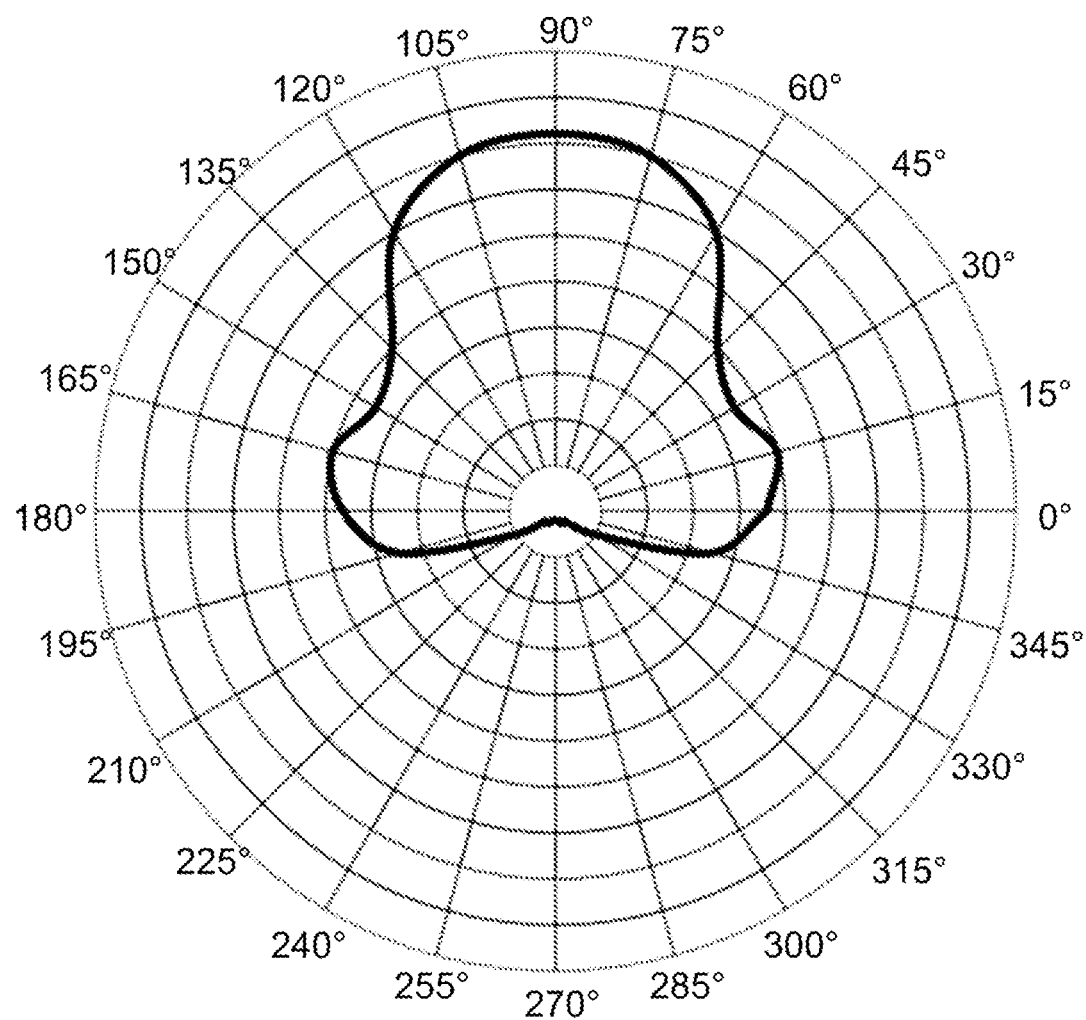
FIG. 6 depicts an exemplary UHF SATCOM antenna pattern due a LNA diplexer assembly being applied to the UHF SATCOM antenna pattern of FIG. 3, in accordance with one or more embodiments of the present disclosure.

Referring now to FIG. 6, a UHF SATCOM antenna pattern 600 are described, in accordance with one or more embodiments of the present disclosure. The UHF SATCOM antenna pattern 600 that the SDR 202a may declare an 00S event only if both antenna elements do not receive the communication packets. When comparing the UHF SATCOM antenna pattern 400 with the UHF SATCOM antenna pattern 600, it can be seen that the node 106a implementing the UHF diversity combiner 208 may result in improved BLOS SATCOM communication in the 30-to-50 degree above horizon, as compared to the node 106b implementing the LNA diplexer assembly 502.

Referring generally again to FIGS. 1-6.

As may be understood, the UHF SATCOM antenna pattern 300, 400, 600 are provided for a single cross-section. However, the gain may exhibit similar tendencies as rotation occurs about the z-axis.

Although the BLOS waveform has been described as being a CDMA waveform such as a Mobile User Objective System (MUOS) waveform, this is not intended as a limitation of the present disclosure. It is contemplated that the disclosure may also apply to a number of full duplex CDMA waveforms with separate uplink and downlink channels, such as, but not limited to legacy UHF SATCOM. Such legacy UHF SATCOM may include, but is not limited to, Demand Assigned Multiple Access (DAMA), Integrated Waveform (IW), Link-16, and the like.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:
1. A platform comprising:
   a node comprising:
      a satellite communication (SATCOM) antenna configured to transmit and receive communications using a beyond line of sight (BLOS) waveform, the SATCOM antenna including a first antenna element and a second antenna element;
      a software-defined radio (SDR) configured to support transmit and receive communications using the BLOS waveform, wherein the BLOS waveform is in an ultra-high frequency (UHF) band and is a code-division multiple access (CDMA) direct sequence spread spectrum (DSSS) waveform;
      a SATCOM radio frequency (RF) amplifier; and
      a UHF diversity combiner including:
         a radio frequency (RF) transfer switch;
         a first receive path for analog signals from the first antenna element, the first receive path including a first analog band-pass filter, a first low-noise amplifier (LNA), and a first analog-to-digital converter (ADC);
         a second receive path for analog signals from the second antenna element, the second receive path including a second analog band-pass filter, a second LNA, and a second ADC;
         a processor configured to generate a combined digital signal by applying a phase offset and a weight factor to digital signals from the first receive path and the second receive path;
         a digital-to-analog converter (DAC) coupled to the processor;
         a transmit path for analog signals from the SATCOM RF amplifier, the transmit path including a third analog band-pass filter; and
         a fourth analog band-pass filter communicatively coupled between the DAC and the SDR.

2. The platform of claim 1, wherein the first antenna element is a crossed dipole antenna provided with a high angle view for zenith communications, wherein the first antenna element is a monopole antenna provided with a low angle view for horizon communications.

3. The platform of claim 2, wherein analog signals provided to the SDR from the fourth analog band-pass filter includes a gain of 3 dB signal to noise ratio (S/N) higher than analog signals from the first antenna element and analog signals from the second antenna element when the BLOS waveform is received at a 40-degree elevation above horizon.

4. The platform of claim 1, wherein the UHF diversity combiner is configured to filter, amplify, and then digitally convert analog signals from the first antenna element and the second antenna element simultaneously and independently to generate digital signals by the first receive path and the second receive path.

5. The platform of claim 1, wherein the processor is configured to determine the phase offset and the weight factor based on a satellite view vector.

6. The platform of claim 5, wherein the processor is configured to determine the satellite view vector based on aircraft position information, aircraft attitude information, and satellite orbit information.

7. The platform of claim 1, wherein the processor is configured to compensate for a receive gain of the combined digital signal to reduce receive signal strength.

8. The platform of claim 1, wherein the BLOS waveform comprises a Mobile User Objective System (MUOS) waveform.

9. The platform of claim 8, wherein the radio frequency transfer switch is a PIN diode RF transfer switch; wherein the processor is configured to receive signal blanking information associated with the MUOS waveform from the SDR; wherein the processor is further configured to switch the PIN diode RF transfer switch based on the signal blanking information.

10. A platform comprising:

a first node comprising:

a satellite communication (SATCOM) antenna configured to transmit and receive communications using a beyond line of sight (BLOS) waveform, the SATCOM antenna including a first antenna element and a second antenna element;

a first software-defined radio (SDR) configured to support transmit and receive communications using the BLOS waveform, wherein the BLOS waveform is in an ultra-high frequency (UHF) band and is a code-division multiple access (CDMA) direct sequence spread spectrum (DSSS) waveform;

a SATCOM radio frequency (RF) amplifier coupled to the first SDR; and a low-noise amplifier (LNA) and diplexer assembly including:

a first receive path for analog signals from the first antenna element, the first receive path including a first diplexer and a first LNA, wherein the first SDR is communicatively coupled to the first receive path;

a second receive path for analog signals from the second antenna element, the second receive path including a second diplexer and a second LNA, wherein a second SDR is communicatively coupled to the second receive path;

a first transmit path for analog signals from the SATCOM radio frequency (RF) amplifier, the first transmit path including an RF transfer switch and the first diplexer, wherein the first antenna element is communicatively coupled to the first transmit path; and a second transmit path for analog signals from the SATCOM RF amplifier, the second transmit path including the RF transfer switch and the second diplexer, wherein the second antenna element is communicatively coupled to the second transmit path; and a second node comprising:

the second SDR configured to support receive communications using the BLOS waveform and support transmit and receive communications using a half-duplex LOS waveform, wherein the second SDR is communicatively coupled to the first SDR by a physical interface, wherein the second SDR provides communication packets from the receive communications using the BLOS waveform to the first SDR by way of the physical interface.

11. The platform of claim 10, wherein the first SDR is configured to collect communication packets from the receive communications of the first antenna element and the second antenna element.

12. The platform of claim 11, wherein the first SDR is configured to declare an out of service (OOS) event upon failing to collect communication packets from both of the first antenna element and the second antenna element.

13. The platform of claim 10, wherein the second node further comprises a secondary antenna configured to transmit and receive communications using the half-duplex LOS waveform.

14. The platform of claim 10, wherein the RF transfer switch is a PIN diode RF transfer switch; wherein the SDR is configured to switch the PIN diode RF transfer switch based on signal blanking information.

\* \* \* \* \*